(12) United States Patent
Despain

(10) Patent No.: US 7,599,426 B2
(45) Date of Patent: Oct. 6, 2009

(54) USE OF ADAPTIVE FILTERS IN MULTIPLE ACCESS WIRELESS SYSTEMS EMPLOYING PREDICTABLE SIGNALS

(75) Inventor: Alvin M. Despain, Los Angeles, CA (US)

(73) Assignee: Acorn Technologies, Inc., Santa Monica, CA (US)

( * ) Notice: Subject to any disclaimer, the term of this patent is extended or adjusted under 35 U.S.C. 154(b) by 1123 days.

(21) Appl. No.: 10/894,913

(22) Filed: Jul. 19, 2004

(65) Prior Publication Data

US 2006/0013292 A1  Jan. 19, 2006

(51) Int. Cl.
*H04B 1/00* (2006.01)
(52) U.S. Cl. .................. 375/152; 375/232; 375/229
(58) Field of Classification Search ........... 375/152, 375/232, 229
See application file for complete search history.

(56) References Cited

U.S. PATENT DOCUMENTS

| | | | |
|---|---|---|---|
| 5,734,598 A | | 3/1998 | Abbott et al. |
| 5,953,327 A | * | 9/1999 | Cox ............ 370/336 |
| 6,175,588 B1 | | 1/2001 | Visotsky et al. |
| 6,580,772 B2 | * | 6/2003 | Pajukoski ......... 375/350 |
| 7,352,799 B2 | * | 4/2008 | Pajukoski ......... 375/148 |
| 2002/0065664 A1 | | 5/2002 | Witzgall et al. |
| 2002/0136277 A1 | | 9/2002 | Reed et al. |
| 2002/0152253 A1 | | 10/2002 | Ricks et al. |
| 2002/0191568 A1 | | 12/2002 | Ghosh |
| 2003/0095529 A1 | * | 5/2003 | Petre et al. ......... 370/342 |
| 2003/0227886 A1 | | 12/2003 | Abrishamkar et al. |

FOREIGN PATENT DOCUMENTS

| | | |
|---|---|---|
| WO | WO 00/67389 A | 11/2000 |
| WO | WO 03/085830 A | 10/2003 |

OTHER PUBLICATIONS

Krauss, "Chip-level MMSE equalization at the edge of the cell", Wireless Communications and Networking Conference, 2000, WCNC, 2000 IEEE, Publication Date: 2000, vol. 1, on pp. 386-392 vol. 1, Meeting Date: Sep. 23, 2000-Sep. 28, 2000, Location: Chicago, IL, USA.*

(Continued)

*Primary Examiner*—Juan A Torres
(74) *Attorney, Agent, or Firm*—Orrick Herrington & Sutcliffe, LLP

(57) ABSTRACT

A code division multiple access (CDMA) radio system uses an adaptive filter in a receiver to mitigate multipath radio propagation and to filter out interfering signals. Characteristics of an initial stage of the filter preferably are determined by cross correlation of a generated pilot signal and the input signal with the integration of the correlation performed over a time period selected to be an integral number of symbol periods. The integration causes the portions of the cross correlation corresponding to the user subchannels to average substantially to zero, so that the pilot channel signal correlation is the primary contribution to the signal used to characterize the channel to establish the coefficients of the adaptive filter for the receiver.

68 Claims, 12 Drawing Sheets

OTHER PUBLICATIONS

Mouhouche, "Reduced-rank adaptive chip-level MMSE equalization for the forward link of long-code DS-CDMA systems", Seventh International Symposium on Signal Processing and Its Applications, 2003, Proceedings, Publication Date: Jul. 1-4, 2003, vol. 1, on pp. 497- 500 vol. 1.*

Colin D. Frank, et al., "Adaptive Interference Suppression for the Downlink of a Direct Sequence CDMA System with Long Spreading Sequences," Part of work was presented at the 36th Annual Allerton Conference on Communication, Control and Computing, Monticello, Illinois, pp. 1-31, Sep. 1998.

Samina Chowdhury, et al, "Reduced-Rank Chip-level MMSE Equalization for the 3G CDMA Forward Link with Code-Multiplexed Pilot," Invited Paper for Special Issue of EURASIP Journal on Applied Signal Processing, pp. 1-27, Jul. 2001.

International Search Report for PCT/US2005/025335, Aug. 2, 2006.

EPO Communication dated Jun. 20, 2008 regarding Application No. 03 726 180.7 —2215.

Saeed V. Vaseghi, "Wiener Filters," Advanced Digital Signal Processing and Noise Reduction, Second Edition, pp. 179-204 John Willey and sons, year 2000.

International Search Report for PCT/US03/10180, Jul. 30, 2003,PCT.

J. S. Goldstein, I. S. Reed and L. L. Scharf, A Multistage Representation of the Wiener filter Based on Orthogonal Projections, IEEE Transactions on Information Theory, vol. 44, No. 7, Nov. 1998.

M. L. Honig, and J. S. Goldstein, "Adaptive Reduced-Rank Residual Correlation Algorithms for DS-CDMA Interference Suppression," In Proc. 32th Asilomar Conference Signals, Systems and Computers, Pacific Grove, CA, Nov. 1998.

D. C. Ricks and J. S. Goldstein, "Efficient Architectures for Implementing Adaptive Algorithms," Proceedings of the 2000 Antenna applications Symposium, Allerton Park, Monticello, IL, Sep. 20-22, 2000.

J. S. Goldstein and I. S. Reed, "Reduced-Rank Adaptive Filtering", IEEE Transactions on Signal processing, vol. 45, No. 2, Feb. 1997.

M. L. Honig and W. Xiao, "Performance of Reduced Rank Linear Interference," work supported by U.S. Army Research office under grant DAAH04-96-1-0378, Jan. 2001.

D. C. Ricks, P. G. Cifuentes and J. S. Goldstein, "What is Optimal Processing for Nonstationary Data?" Conference Record of the Thirty Fourth Annual Asilomar Conference on Signals, Systems and Computers, Pacific Grove California, Oct. 29-Nov. 2, 2002.

J. S. Goldstein and I. S. Reed, "Performance measures for Optimal Constrained Beamformers," IEEE Transactions on Antennas and Propagation, vol. 45, No. 1, Jan. 1997.

J. S. Goldstein, I. S. Reed, and R. N. Smith, "Low-Complexity Subspace Selection for Partial Adaptivity", Proceedings of IEE Milcom, Oct. 1996.

W. L. Myrick, M. D. Zoltowski and J. S. Goldstein, "Low-Sample Performance of Reduced-Rank Power Minimization Based Jammer Suppression for GPS," IEEE 6th International Symposium Tech. & Appli., NJIT, New Jersey, Sep. 6-8. 2000.

W. Chen, U. Mitra and P. Schniter, "Reduced Rank Detection Schemes for DS-CDMA Communication Systems," private communication, Jan. 2002.

J. Scott Goldstein, et al., "A New Method of Wiener Filtering and its Application to Interference Mitigation for Communications," IEEE, pp. 1087-1091, 1997.

Belkacem Mouhouche, et al., "Chip-Level MMSE Equalization in the Forward Link of UMTS-FDD: A Low Complexity Approach," IEEE, pp. 1015-1019, 2003.

M. Joham, et al., "A New Backward Recursion for the Multi-Stage Nested Wiener Filter Employing Krylov Subspace Methods," pp. 1-4. IEEE, Oct. 28, 2001.

Michael L. Honig, "Adaptive Reduced-Rank Interference Suppression Based on the Multistage Wiener Filter," IEEE Transactions on Communications, vol. 50, No. 6, pp. 986-994, Jun. 2004.

* cited by examiner

USE OF ADAPTIVE FILTERS IN MULTIPLE ACCESS WIRELESS SYSTEMS EMPLOYING PREDICTABLE SIGNALS

BACKGROUND

1. Field of the Invention

The present invention relates generally to the processing of signals in code division multiple access (CDMA) wireless systems such as CDMA cellular radiotelephone systems. More particularly, the present invention relates to the equalization and filtering by an adaptive filter (AF) of a CDMA signal that may have been corrupted by distortion, noise and interference during transmission from the base station to the user handset.

2. Description of the Related Art

Code division multiple access or CDMA techniques are gaining popularity in current and next generation wireless networks as an efficient way of improving capacity, both with regard to the number of users and the achievable bit rates. Examples of CDMA wireless networks include those that operate according to the IS-95 standard, currently in use in the United States for mobile cellular telephone networks, and those networks using successor technologies such as CDMA 2000 and specifically the nearest term successor technology, CDMA 2000-1x. Another CDMA technology gaining acceptance is WCDMA. This background discussion and the subsequent discussion of implementations of the invention make specific reference to the structure and implementations of CDMA 2000-1x. This is not intended to be limiting. The invention described below can be applied to the various versions of CDMA 2000, to various versions of WCDMA and to other successor technologies.

Because CDMA signals simultaneously occupy a given frequency band and an arbitrarily long time interval, CDMA systems use codes that identify users to achieve multiplexing (code division) of users. Different base stations (corresponding for example to different cells) need isolation within the CDMA system so that a receiver can readily distinguish between base stations. Generally the isolation between base stations is accomplished with another code, different from the code that identifies users. As such, the CDMA 2000-1x system, like its predecessor IS-95, uses orthogonal codes (e.g., Walsh codes) to identify or isolate user subchannels and system control subchannels, and uses maximal length sequences (e.g., pseudo-noise "PN" codes) to identify or isolate different base stations. The service provider reuses a given frequency band within its network by employing it in cells that are spaced apart by a sufficient distance so that the cells do not unduly interfere with each other's transmissions when the PN codes employed by adjacent cells are different. This difference can be as simple as a significant time displacement between two copies of the same basic PN code. This is the approach employed in the CDMA 2000 system for example.

WCDMA operates similarly. In WCDMA, the functions that separate individual user subchannels are called orthogonal variable spreading functions (ovsf). Where the terms "Walsh function" or "Walsh code" is used in the following discussion, it is intended to include the orthogonal variable spreading functions as well as other similarly used orthogonal functions or codes.

A CDMA base station constructs its downlink signal by assigning each subchannel an identifying Walsh code or other orthogonal code and using that orthogonal code to spread the subchannel's signal. Unique orthogonal codes are assigned to the user subchannels so that a receiver can select its subchannel from the base station broadcast and reject the other subchannels using the code. The base station also modulates the user's signal with a PN code (and/or a time shifted version of a common PN sequence) specifically identifying that base station on the network. Each base station uses the first subchannel as a pilot channel by sending a known data stream, generally consisting of all 1's, over the channel. The pilot channel is used by terminal receivers to identify and lock onto the signal from a desired base station. A second of the base station's subchannels (the sync channel) is employed to transmit control information to the receiver terminals. Most of the bits transmitted on the sync channel are predictable. The other base station subchannels contain (from the receiver viewpoint) more or less random user bits.

Interference sources of concern to receivers in a CDMA system include multipath arriving within the time window (e.g., 14 μs) used by a receiver for observing signals. Other interference sources include the downlink signals from base stations other than the one the receiver is using for communication. The Walsh codes and PN codes are designed to prevent interference between subchannels and with other base stations. Some interference is inevitable. Although separate PN sequences are nearly (or are forced to be) orthogonal to each other, the orthogonality condition requires an integration time as long as the code. Generally, the symbol period consists of a number of chips that represent the period of the Walsh code. The symbol period is often 64 chips for IS-95 and CDMA-2000 systems, and can be between four chips and 512 chips for various CDMA systems. Therefore, the typical observation intervals are too short relative to the codes to achieve complete orthogonality relative to physically adjacent base stations to prevent interference from such base stations. This interference is reduced by the code properties but is dependent on the power of the signals from other base stations at the receiver, which can be higher than the power from the desired base station when fading is present.

The simultaneous presence of all the subchannels and the use of both a subchannel code (orthogonal or Walsh code) and a base station code (e.g., PN code) make it difficult to use equalization techniques to increase the capacity of existing CDMA networks, including CDMA 2000 networks. Most of the work to date on CDMA reception involves the use of rake receivers to mitigate multipath and to improve reception when multiple user interference occurs. Plural, generally independent, receiving channels known as rake fingers are provided in a rake receiver to improve, for example, processing of the signals associated with multipath and signals received from different base stations.

Rake receivers generally are made up of a searcher and a combiner, which includes the rake fingers. The searcher utilizes the pilot channel to locate, in time, a unique strong signal for each rake finger. The searcher employs the pilot subchannel to identify path delays, amplitudes and phases and provides that information to the respective rake fingers, which use the information to better recover the different multipath contributions. Because the number of rake fingers is limited, the rake receiver cannot assign a rake finger to all significant multipaths. A typical rake receiver tracks only three paths, although suggestions have been made to track up to twelve paths. The need to track additional multipath contributions is most prominent in urban environments. There are other shortcomings to rake receivers, such as performance dependent on the separation of path delays.

SUMMARY OF THE PREFERRED EMBODIMENTS

An aspect of the present invention provides a CDMA wireless communication system including a receiver having an adaptive filter coupled to receive an input signal comprising a plurality of user signals and a pilot signal. The input signal is characterized by a symbol period defined by a CDMA transmitter. The adaptive filter has at least one filter coefficient determined from the input signal multiplied by a synthesized pilot signal with a result integrated over one or more symbol periods.

Another aspect of the present invention provides a CDMA wireless communication system including a receiver having an adaptive matched filter coupled to receive an input signal comprising a plurality of user signals and a pilot signal. The input signal is characterized by a symbol period defined by a CDMA transmitter. The adaptive matched filter has at least one filter coefficient determined by cross correlation of the input signal with a generated pilot signal where the cross correlation is performed over one or more symbol periods.

Another aspect of the present invention provides a CDMA wireless communication system including a receiver with an adaptive matched filter coupled to receive an input signal comprising a plurality of user signals and a pilot signal. The input signal is characterized by a symbol period defined by a CDMA transmitter. The adaptive matched filter has a set of filter coefficients determined by a multiplication and an averaging calculation on the input signal and a predetermined reference signal generated by the receiver. The averaging is performed for a plurality of symbol periods.

Another aspect of the present invention provides a CDMA wireless communication system including a receiver having an adaptive matched filter coupled to receive an input signal comprising a plurality of user signals and a pilot signal. The input signal is characterized by an orthogonal code modulation. The adaptive matched filter has a set of filter coefficients determined from a cross correlation between the input signal and a reference signal generated by the receiver, using an integration for two or more orthogonal code periods in the cross correlation.

Another aspect of the present invention provides a CDMA wireless communication system including a receiver having an adaptive Wiener filter coupled to receive an input signal comprising a plurality of user signals and a pilot signal. The plurality of user signals is characterized by an orthogonal code modulation. The Wiener filter has at least one filter coefficient determined by a correlation process between the input signal and a reference signal generated by the receiver, with the averaging performed for one or more orthogonal code periods.

Another aspect of the present invention provides a CDMA wireless communication system including a receiver having an adaptive multistage Wiener filter coupled to receive an input signal comprising a plurality of user signals and a pilot signal. The plurality of user signals is characterized by an orthogonal code modulation. The adaptive multistage Wiener filter has at least one set of filter coefficients determined from a cross correlation between the pilot signal and the input signal in one processing stage so that the cross correlation characterizes a channel between the receiver and a CDMA transmitter, the adaptive multistage Wiener filter filtering the input signal in the one processing stage and in other processing stages.

Another aspect of the present invention provides a CDMA wireless communication system including a receiver having an adaptive filter coupled to receive an input signal comprising a plurality of user signals and at least one pilot signal. The plurality of user signals are each modulated by a Walsh code. The plurality of Walsh code modulated signals and the pilot signal are further modulated by at least one of a set of pseudo random codes. The adaptive filter comprises a matched filter having at least one matched filter coefficient determined by correlating the input signal and the pilot signal in time segments, magnitudes of user signals averaging substantially to zero over the time segments so that the matched filter coefficients are obtained substantially from the pilot signal. The correlating process characterizes a signal channel between the receiver and a CDMA transmitter. The matched filter is used to filter the input signal.

Another aspect of the present invention provides a CDMA wireless communication system including a receiver having an adaptive filter coupled to receive an input signal comprising a plurality of user signals and at least one pilot signal. The user signals are modulated by Walsh codes. The modulated user signals and the pilot signal are further modulated by at least one of a set of pseudo random codes. The adaptive filter comprises at least a matched filter having matched filter coefficients determined by averaging of correlations of the input signal with the pilot signal over one or more Walsh code periods. Magnitudes of correlations from user signal components of the input signal average substantially to zero over the one or more Walsh code periods so that the at least one adaptive filter coefficient is obtained from at least the pilot signal. The correlations characterize a signal channel between the receiver and a CDMA base station. The matched filter is used to filter the plurality of user signals.

Another aspect of the present invention provides a CDMA wireless communication system including a receiver having an adaptive filter coupled to receive an input signal comprising a plurality of user signals and at least one pilot signal. At least the plurality of user channels are modulated by Walsh codes. The plurality of user signals and the pilot signal are modulated by at least one of a set of pseudo random codes. The adaptive filter comprises at least a matched filter having matched filter coefficients determined by integrating calculations on the input signal over one or more Walsh code periods. Magnitudes of user signals integrate substantially to zero over the one or more Walsh code periods so that the matched filter coefficients are obtained from at least the pilot signal in an initial processing stage that characterizes a signal channel between the receiver and a CDMA base station. The matched filter is used to filter the plurality of user signals.

BRIEF DESCRIPTION OF THE DRAWINGS

Preferred exemplary embodiments of the present invention are described here with reference to the accompanying drawings, which form a part of this disclosure, and in which like numerals denote like elements.

DETAILED DESCRIPTION OF THE PREFERRED EMBODIMENTS

Figure 1:
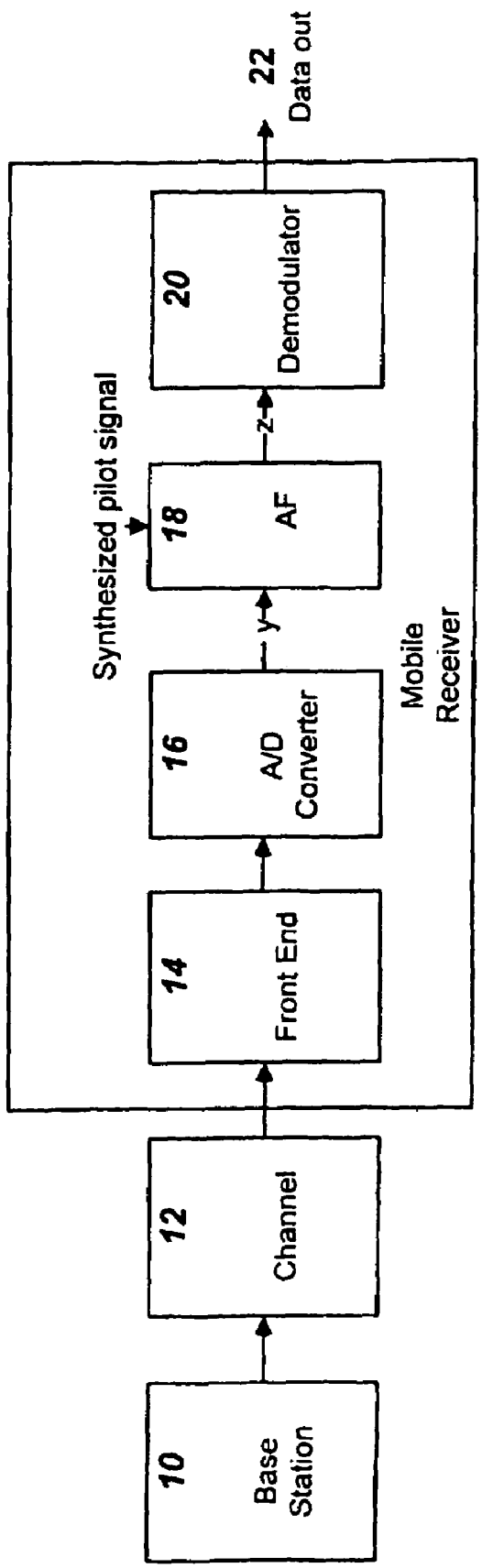
FIG. 1 illustrates a preferred implementation of a downlink CDMA system according to the invention. A particularly preferred adaptive filter, for example as illustrated in FIGS. 2 or 6, is provided between the digitizer and the receiver demodulator.

One of the most common wireless applications is in cellular telephone communications. Cellular telephone communication often involves mobile receivers and rapidly changing multipath or physical delay environments. Other types of wireless receivers such as cellular modems face similar challenges. In some extreme environments, the wireless communications channel can change significantly over a few centimeters and mobile receivers can move many centimeters per second. The rapidly changing multipath environment makes it difficult to use adaptive filters in mobile wireless communication applications. This problem is made more difficult for code division multiple access (CDMA) wireless communication, where one or more levels of overlaid codes generally must be demodulated before channel analysis and compensation can be performed.

The problems associated with applying an adaptive filter to a CDMA wireless communications system are illustrated by U.S. Pat. No. 6,175,588 to Visotsky, et al. That patent's system provides an equalizer prior to the demodulation portion of the receiver. The equalizer adapts using an error signal generated by demodulating the pilot code signal, comparing the demodulated pilot code signal with the expected form of the pilot code signal and generating the error signal from the difference between the demodulated and expected signals. Because the equalizer is a feedback system requiring a long channel memory and because the error signal is based on analysis of an earlier sample of the channel, the Visotsky patent's system has a long channel memory. It is poorly suited to rapidly changing channels and cannot be used in typical CDMA cellular telephone applications.

Preferred implementations of the present invention avoid the use of filters or calculations that have long channel memories. Rather, preferred implementations of the present invention characterize the channel to determine a set of filter coefficients based on the instantaneous characterization of the channel and use that instantaneous set of filter coefficients to filter the input data. These preferred implementations are more accurately characterized as feed forward adaptive filters in contrast to the feedback sort of adaptive filter described in the Visotsky patent. The discussion here uses the term "adaptive filter" in its broad sense as being a filter that considers its environment and responsively changes the filter. Generally speaking there are feedback adaptive filters and feed forward adaptive filters.

According to another preferred aspect, implementations of the present invention characterize at least the physical delay portion of the channel prior to decoding the input signal. Instead of decoding the input signal to obtain a signal sufficiently understandable for channel analysis, preferred implementations of the present invention analyze the channel using a predictable portion of a typical input signal. These preferred implementations perform a correlation function to remove unpredictable portions of the input signal and to better isolate the predictable portions of the input signal.

Most preferably, implementations of the present invention analyze an input wireless CDMA signal to isolate a predictable portion of the input signal and use that portion of the input signal to at least partially characterize the channel. This analysis is used to establish the coefficients of a matched filter which is then used to filter the same input signal that was used to establish the filter coefficients. The portion of the matched filter determined in this way is free of feedback effects and so has a short channel memory. Here the matched filter is preferably the optimal filter assuming no noise or interference. The matched filter resolves multipath contributions, delays the different contributions as appropriate and coherently combines the multipath contributions.

A particularly preferred implementation of this sort of matched filter is within a multistage Wiener filter, which adds to the matched filter stages that address noise and interference. Most preferably, these additional filter stages are also implemented so as to limit channel memory and to emphasize the instantaneous characterization of the channel.

Preferred implementations of the present invention provide an adaptive filter that can advantageously be used in CDMA cellular radiotelephone systems that utilize pilot signals. Examples of such systems are the CDMA 2000 and the WCDMA cellular telephone systems. The filter for a mobile communication system like the CDMA 2000 system is adapted for changing channel conditions that occur as the mobile unit moves. In preferred applications of this invention to a CDMA 2000 system the continuous pilot subchannel is used to adapt the filter. The adaptive filter can ameliorate multipath transmission distortion (i.e., equalize) and reject, to some extent, interfering signals. There are a number of different adaptive filters in which aspects of the present invention might be implemented, including adaptive matched filters, adaptive Kalman filters, adaptive Wiener filters and others.

Adaptation is based for example on the PN code (for CDMA-2000) or the Gold code (a special PN code for WCDMA) (and possibly the fixed Walsh code) of the pilot channel, as appropriate, which is known and can be directly generated in the receiver. For each subchannel other than the pilot channel in a CDMA 2000 system, the Walsh code function has a value of zero when averaged over a predetermined period referred to as the Walsh period. A preferred CDMA receiver cross correlates the composite received signal with a receiver generated replica of the PN code signal, with the integration or averaging aspects of the cross correlation performed over an integral number of complete Walsh code periods. Because of the orthogonality of the Walsh codes over the Walsh period, the individual traffic channels (excluding the pilot channel), average to, or at least close to, zero when cross correlated and integrated over a number of complete Walsh periods.

The cross correlation of the received signal with the receiver generated (synchronized) replica of the PN code does not integrate or average to zero over the Walsh period for the pilot signal components of the received signal. Rather, the cross correlation of the composite received signal with the synchronized PN code substantially identifies the pilot signal and the multipaths of the pilot signal from the base station to the receiver that arrive within the observation window (14 µsec). This characterizes the channel and allows the filter to be adapted according to the detected characteristics of the channel. Adaptation in a preferred filter implementation proceeds by computing one or more of the parameters of the filter over one or more complete Walsh function periods, preferably starting at the point where a new symbol begins and ending where a symbol ends. If the integration interval for the initial cross correlation differs from a number of complete Walsh function periods, the result will be degraded operation of the filter roughly proportional to the ratio of the integration interval and the next longer period of a number of complete Walsh function periods.

In existing CDMA 2000 systems, the pilot channel data is a constant series of binary 1's. The pilot channel is spread by the zeroth order Walsh function, which is also all 1's. The spread pilot channel data are consequently all 1's. When spread pilot channel data are combined with the PN code, therefore, the resulting signal is the PN code by itself linearly combined into the transmitted base station signal as the pilot subchannel. Other choices could be made for the pilot channel data and Walsh code, but as long as both are known to the receiver, the use of the pilot channel as described below is unaffected. The pilot channel is always a known quantity and can be used in adapting a filter.

Other predictable aspects of a base station down link signal might also be used in adapting a filter for a CDMA receiver. CDMA 2000 systems use the sync channel to provide frame synchronization, time base synchronization and to communicate some control information that is common to all user subchannels. A good part of the time, the bits sent in this sync subchannel can be determined a priori. The sync subchannel therefore can be used, in part or in whole, to help adapt the filter, since both the bits and the Walsh code are known most of the time. On the other hand, using the sync channel to adapt the filter adds complexity to the receiver system and may provide only a nominal improvement relative to employing the pilot subchannel alone.

Each user subchannel, if it is being used, contains a bit stream unknown to the receiver. Nevertheless, the modulation scheme employed, for example bipolar signaling, is known a priori and can be exploited to adapt the filter too, but again at the cost of added complexity.

Finally, it is possible to combine all three methods to improve the performance of the adaptive filter. For clarity, this discussion emphasizes using the pilot channel to adapt a filter for a CDMA receiver.

Some embodiments may only utilize the pilot subchannel to compute the adaptive filter. A theoretical system could just extract the pilot subchannel, adaptively generate a filter for it and then use the same filter to filter the raw received signal (composed of all active subchannels) to equalize and reduce the effects of interference and noise. The output from the adaptive filter would be processed in the usual way. Such a theoretical system would work because all the user subchannels propagate at the same time, over the same paths and at the same carrier frequencies (i.e., with the same Doppler shifts, etc.) as the pilot subchannel, so a single set of adaptive filter weights can be utilized to equalize and filter all the subchannels at once.

It is difficult to extract the pilot subchannel alone and so these theoretical systems are unattractive. Preferred embodiments of this invention achieve a similar result by employing the synchronized PN sequence as the reference basis for computing at least a portion of the adaptive filter parameters. An exemplary system may be an adaptive matched filter that compensates for multipath. The system cross correlates the baseband signal at the receiver with the synchronized PN sequence and integrates the cross correlation coefficients over an integer multiple of the Walsh function period, preferably starting at the beginning of a symbol. This assures that the pilot subchannel signal will primarily determine the cross correlation result. The cross correlation result is normalized and used as the set of weights for a matched finite impulse response (FIR) transversal filter. The effects of all the other subchannels on the filter adaptive parameters ideally integrate to zero. The resulting matched FIR filter is then used to filter the raw received signal prior to passing the signal to the demodulator.

Integration or, equivalently, a moving average with either integration or moving average performed over an integral number of Walsh code periods, is a preferred strategy for initially characterizing the channel. A slightly less effective but also somewhat less expensive method is to divide each of the received data signal y, PN code streams and other intermediate signals into a series of blocks in which the block length corresponds to an integral number of Walsh code periods, preferably beginning at the start of the Walsh period. Correlation is then performed, block by block, by calculating the inner (dot) product of each single block of $y_0$ with the corresponding block of PN code stream and then normalizing the result. Either integration based correlation or block correlation is used to characterize the channel and establish a set of filter coefficients for filtering input data.

The Wiener filter is of special interest here as it is the optimal linear filter for processing received signals. The Wiener filter is defined as the vector w that satisfies the matrix equation Rw=r, where R is the covariance matrix of the received signal that is presented to the Wiener filter and r is the cross correlation vector of the received signal and the signal sent into the communication channel for transmission. The time-domain form of the Wiener filter is typically implemented as a finite impulse response (FIR) filter that consists of a tapped delay line with all the tap signals weighted and summed to produce the filter output. Specifying the weight vector w to be applied to the tap signals prior to summing is one way of describing this implementation of a Wiener filter. An especially advantageous class of Wiener filter, the multistage Wiener filter, is employed here to illustrate aspects and advantages of the invention. The multistage Wiener filter can be relatively inexpensive to implement.

To adapt a Wiener filter, one repeatedly calculates the covariance matrix R and the cross correlation vector r and then repeatedly solves for the weight vector w at a rate sufficient to capture the dynamic changes in the characteristics of the communication channel. Then the set of weights w is used for the FIR filter in filtering the received signal. This can be expensive to accomplish. The CDMA systems of interest here cannot directly calculate a consistent cross correlation vector r and covariance matrix R. On the other hand, there are methods to achieve Wiener filtering without having to explicitly solve the Wiener equation for w. Some of these methods do not require calculation of the matrix R but only parameters easily calculated for CDMA systems of interest.

As discussed above, the integration part of the cross correlation process is preferably over a number of complete Walsh code periods for at least one filter component of an adaptive filter. In multistage Wiener filter implementations, the at least one adapted filter component preferably is part of an initial stage of the multistage Wiener filter. Of course, depending on the particular implementation, this stage may only be conceptually "initial." If the selected integration interval for the initial stage of the multistage Wiener filter is only approximately an integer multiple of the Walsh function period, some degradation of performance is expected to result.

The cross correlation vector of the initial filter stage estimates the physical channel delay spectrum. The characteristics of interfering signals are estimated in the cross correlation vectors of the following stages. Because some of the parameters of the multistage Wiener filter also characterize noise and interference in the received data, other values for the integration window may be preferred for these particular parameters. Therefore it may be advantageous, experimentally via simulation or by analysis, to adjust the integration window size for some filter parameters for each noise and interference environment to be encountered. For example, this can apply to the stages following the initial stage in the multistage Wiener filters.

Implementations of the present invention need not ever explicitly extract the pilot channel to calculate the filter weights.

FIG. 1 illustrates a downlink for a CDMA system that includes an exemplary implementation of aspects of the present invention. On the left is the base station transmitter 10. The base station 10 feeds the physical propagation channel 12. As illustrated, the physical propagation channel 12 includes distortions such as additive white Gaussian noise, Rayleigh fading and multipath. The front-end 14 of the receiver in the handset receives signals from the physical propagation channel 12, and the front end 14 of the receiver converts the received signal to baseband. In this example the analog-to-digital converter 16 within the receiver digitizes the baseband signal output by the front end 14. The analog-to-digital converter 16 (digitizer) sends the digitized baseband signal to the adaptive filter 18. The adaptive filter 18 acts in the FIG. 1 downlink to compensate for multipath effects in the communication channel 12 and to filter out interfering signals. The output of the adaptive filter is provided to channel demodulator 20 for extracting the sub-channels of interest. The demodulator 20 extracts the pilot channel, the sync channel, etc., and the user traffic channel or channels and sends them 22 to the remaining handset circuits.

For preferred implementations of a receiver according to the invention, a searcher is utilized to pick out a group of strong path signals that fall into a time window whose width is set by the expected delay spread of signals from a single base station to a handset that is serviced by that base station. For example, in CDMA-2000-1x the delay spread is assumed to be about 14 microseconds or about 16 chip times and so that is selected as the window width. In preferred implementations of the present invention, the searcher preferably aligns the generated PN sequence with the center of a window containing the group of strong path signals rather than to a single strong signal. The searcher synchronizes a local clock and PN sequence generator with the base station signal. The clock signal, the generated pilot PN sequence and the stream of sampled received signal values are input to the adaptive filter 18 within the preferred receiver of FIG. 1.

The adaptive filter 18 of FIG. 1 is preferably a multistage adaptive filter that characterizes the communication channel multipath structure 12 and uses that characterization to adapt at least an initial filter stage to the communication channel. The remaining stages of the preferred multistage adaptive filter are adaptively determined to filter out noise, interference and other artifacts of the received signal. The adaptive filter 18 of FIG. 1 preferably utilizes the known pilot channel signal to adapt at least the initial stage of the filter. In particular, at least one of the filter coefficients is preferably calculated by integrating the instantaneous estimates of the filter coefficients over one or more orthogonal or Walsh function periods. This integration ensures that all the unknown user signals encoded by the orthogonal (e.g., Walsh or ovsf) functions substantially cancel out leaving the effect of the pilot subchannel, which allows the receiver to determine the filter coefficients. Since the communication channel changes slowly relative to the integration time, the adaptive filter can integrate over many symbols while still tracking channel changes and adapting to interfering signals.

Particularly preferred implementations of a receiver according to the present invention may use an adaptive multistage Wiener filter. The adaptive multistage Wiener filter performs one or more correlation operations on the received signal to characterize the physical communication channel. The preferred embodiments of a multistage Wiener filter in accordance with the invention preferably process the received signal and a reference PN code signal that has been generated in the receiver and synchronized with the dominant pilot signals received from the desired base station to establish a set of filter characteristics used in an initial stage of the filter. This initial stage is in effect a matched filter.

The following discussion illustrates the implementation of aspects of the invention in two exemplary multistage Wiener filters:

1) A modified Ricks-Goldstein multistage Wiener filter. The Ricks-Goldstein multistage Wiener filter is described in detail in U.S. patent application Ser. No. 09/933,004, "System and Method for Adaptive Filtering," published as US 2002/0152253, which application and publication are hereby incorporated by reference in their entirety; and 2) A modified Despain multistage Wiener filter. The Despain multistage Wiener filter is described in U.S. patent application Ser. No. 10/348,670, "Adaptive Multistage Wiener Filter" and in WIPO publication number WO 03/085830 A1, which application and publication are hereby incorporated by reference in their entirety.

The portion of the initial stage Wiener filter coefficients that depend on the cross correlation between the desired signal and the received signal are calculated in a manner that is preferably sensitive only to the pilot signal. In the Ricks-Goldstein adaptive filter or Despain adaptive filter, the first stage filter $h_1$ is calculated by correlating the generated PN code stream with the input received signal vector $y_0$ and then normalizing. Note that the resulting $h_1$ is a matched filter.

In effect, the multi-stage Wiener filter used in preferred embodiments of the present invention captures the physical channel delay spectrum in the initial stage $h_1$. For the Ricks-Goldstein adaptive filter and the Despain adaptive filter the characteristics of interfering signals are captured in the other h filters of the following stages. The multi-stage Wiener filter implementations then optimally combine the outputs of all the filter stages to derive the equalized output, which is then sent to the demodulator (20 in FIG. 1) to recover the user data.

The pilot channel need not be explicitly extracted to calculate the adaptive filter weights.

Application to the Ricks-Goldstein Multistage Wiener Filter

Figure 2:
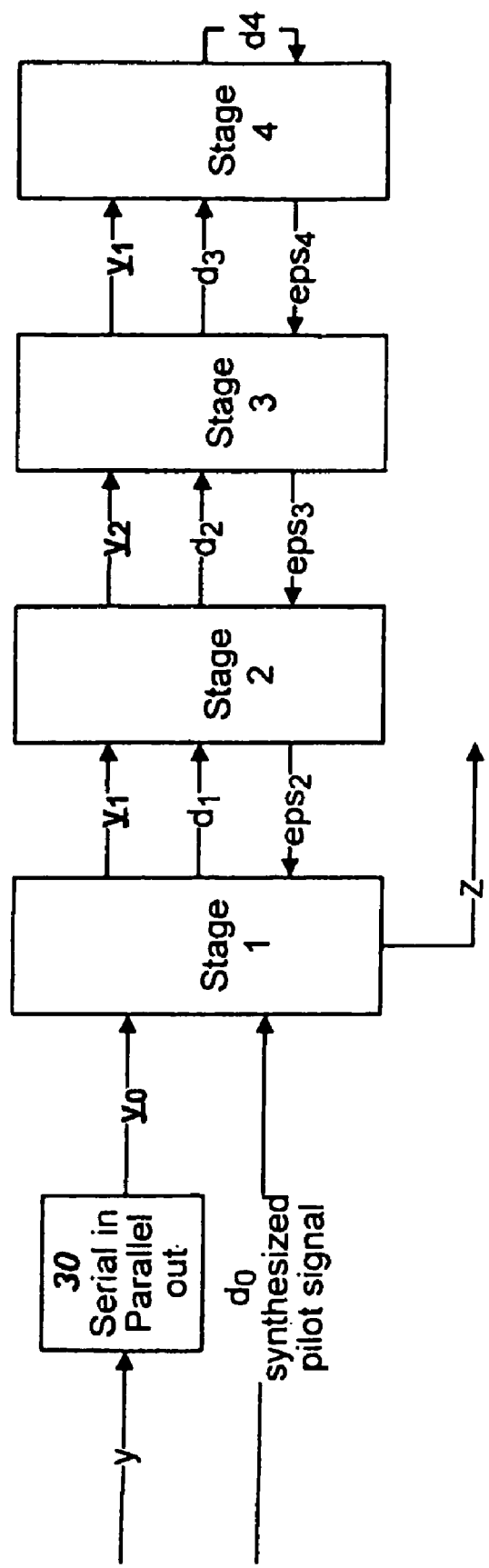
FIG. 2 illustrates the structure of a version of a Ricks-Goldstein multistage Wiener filter with four stages in accordance with preferred aspects of the present invention.

FIG. 2 illustrates an adaptive Ricks-Goldstein (RG) multistage Wiener filter that can be used as the filter 18 in FIG. 1. Four stages are illustrated for the FIG. 2 RG adaptive filter. Simply adding or deleting stages constructs either larger or smaller filters. There will be an optimal number of stages for a given application, which number can be determined in several ways including by experimenting with the particular system of interest.

The receiver synthesizes the reference pilot signal in the usual way and the receiver searcher (not shown) approximately aligns the synthesized pilot signal with a group of the strongest received pilot signals (signal paths) that are grouped within a time window. The time window is defined by the length of shift register 30 and chosen to be about 14 microseconds for CDMA 2000-1x systems. The output of shift register 30 is a vector of samples $y_0$. Shift register 30 provides a serial to parallel channel reorganization of the received signal y to the parallel vector $y_0$.

Figure 3:
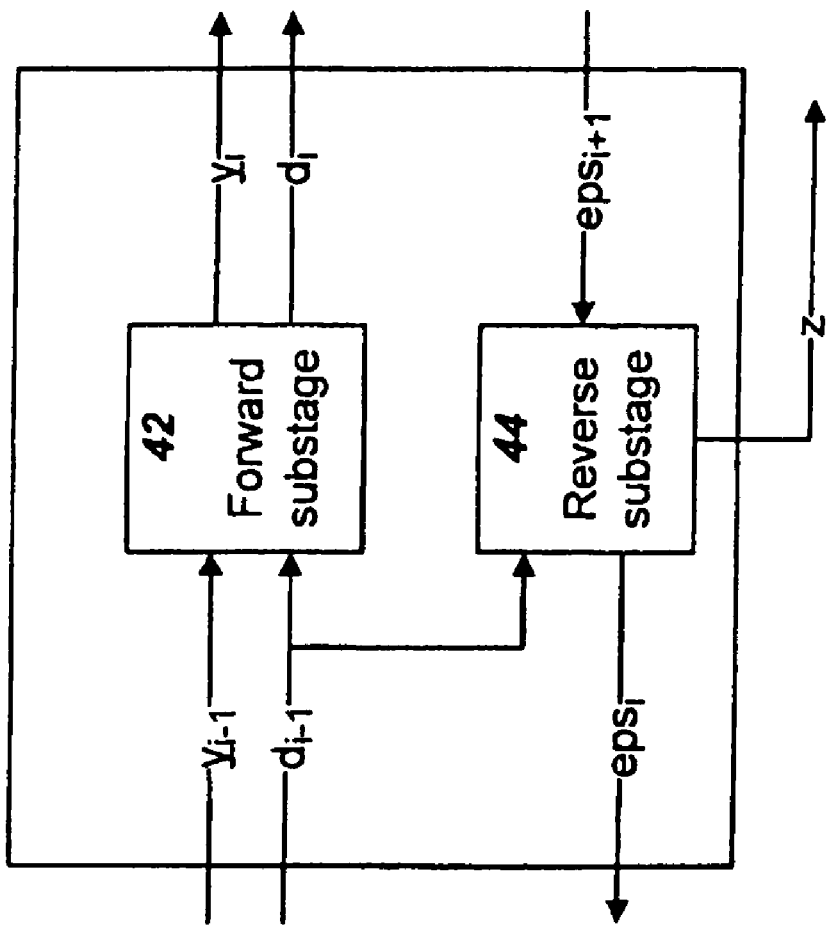
FIG. 3 illustrates the structure of a stage of the FIG. 2 adaptive filter. All four stages of the FIG. 2 filter preferably are structurally identical. The four stages may in general differ parametrically in the size of their integration window (this translates to the length of the shift register employed in the integration circuit).
Figure 4:
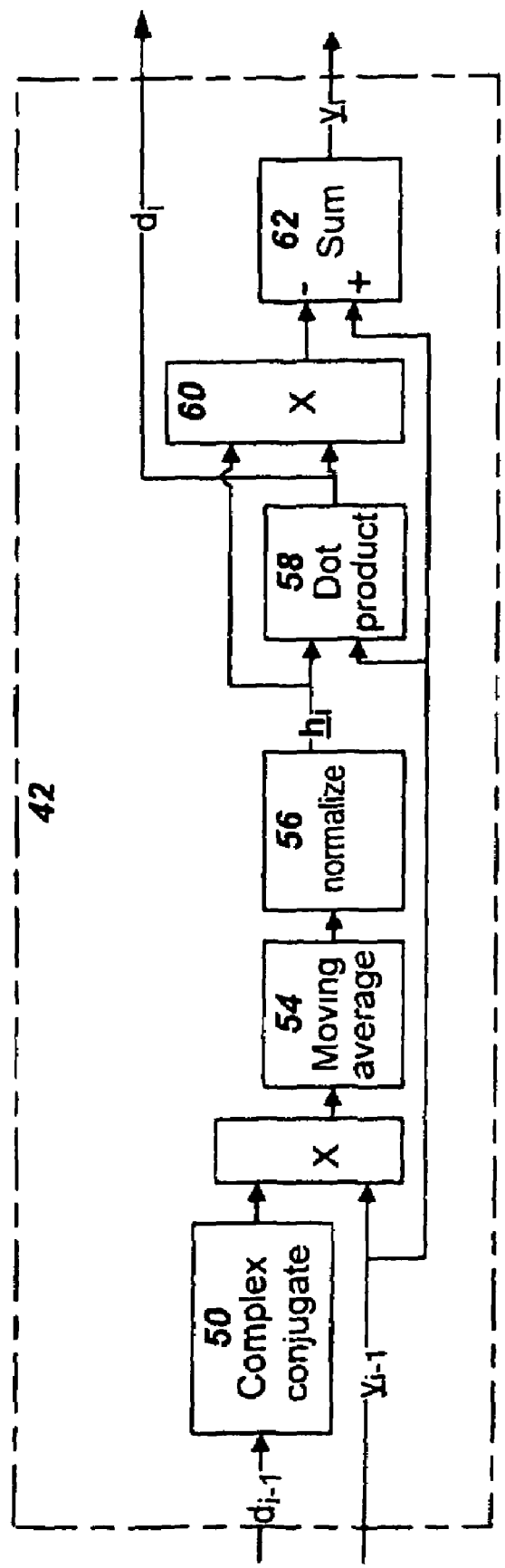
FIG. 4 illustrates the structure of a forward sub-stage of the FIG. 3 adaptive filter stage.
Figure 5:
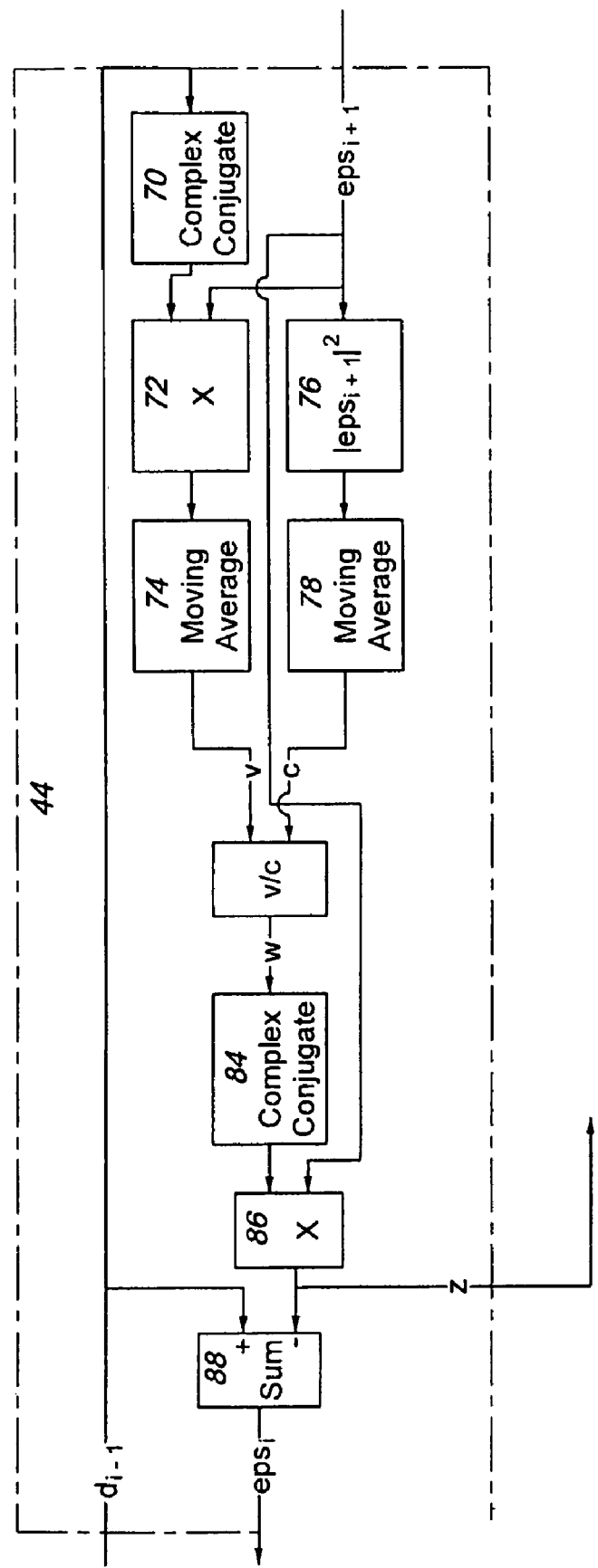
FIG. 5 illustrates the structure of a reverse sub-stage of the FIG. 3 adaptive filter stage.

The structure of the four stages (which are identical) is shown in FIG. 3. There are two parts to each stage, a forward substage 42 shown in FIG. 4 and a reverse substage 44 shown in FIG. 5.

The forward substage 42 multiplies the input vector of signals $y_{i-1}$ by the complex conjugate 50 of the intermediate scalar signal $d_{i-1}$. For the first stage, $y_0$ is the output of block 30 and $d_0$ is the synthesized pilot signal. The moving average block 54 within the forward substage 42 then integrates this product in accordance with a preferred aspect of this invention. Next the result is normalized 56 to produce a set of filter coefficients $h_i$. The coefficients $h_i$ are employed to filter the signal vector $y_{i-1}$ by generating the dot product 58 of $y_{i-1}$ and $h_i$ to produce a new intermediate scalar signal $d_i$. $h_i$ and $d_i$ are then multiplied 60, and the result is subtracted 62 from the input signal $y_{i-1}$ producing the new signal $y_i$, which is output to the next stage along with $d_i$.

In the first stage, the moving average block 54 integrates the instantaneous estimate of the forward filter stage coefficients so as to reduce or eliminate all received signal influences except that of the pilot channel signal. The moving average may be computed by summing an initial span and then averaging. Subsequent values are computed by adding in a number n (greater than or equal to 1) of new elements to the sum, subtracting the n oldest elements, and computing the new average. In 54, one value, for example, is added to the sum and one subtracted at each step. The number of items summed (the length of the span or the window width) represents one or preferably more complete periods of the Walsh function or ovsf.

A slightly less effective but also somewhat less expensive method of correlation and integration is to divide the intermediate signal to be integrated into a series of blocks in which the block length corresponds to a number of complete Walsh code periods, preferably beginning at the start of a Walsh period. Integration is then performed, block by block. Preferably the length of integration is selected to be long enough to sufficiently reduce noise and short enough for the channel characteristics to not vary excessively.

The moving average block preferably cancels out the effects of the subchannel signals other than the effect of the pilot channel signal. The cancellation is due to the orthogonality of the Walsh or orthogonal codes and due to the integration over the respective Walsh or orthogonal code periods. Preferably the integration interval is chosen to be a number of complete code periods. This reduces the effects of noise. The integration interval is, on the other hand, limited in duration so that the channel does not change appreciably over the integration interval. Simulations of practical systems are preferably used to determine an appropriate integration interval (measured in complete code periods), whether for this multistage Wiener filter embodiment or for other adaptive filters according to this invention. Because it may be desirable to use one integration interval for the initial, matched filter stage and a different interval for subsequent stages, it may be desirable to use simulations to set the different integration intervals.

Reverse substage 44 is shown in FIG. 3. The reverse substage 44 can be thought of as one stage of a Wiener filter that works on the output $d_{i-1}$ from the previous (i−1) stage and the signal $eps_{i+1}$ from the next stage. In the case of the last stage, stage n, the value $d_n$ from the forward substage of stage n is used as the $eps_{i+1}$ input to the reverse substage n. The squared magnitude of this signal, $|eps_{i+1}|^2$, is calculated and integrated 78 over a sliding window as described above producing the signal c. A moving average calculation with spans possibly the same or possibly longer from those used in the initial stage may also be employed in the reverse substage blocks 74 and 78. Next an intermediate scalar variable v is calculated as the product 72 of $eps_{i+1}$ and the complex conjugate 70 of $d_{i-1}$ integrated 78 over a sliding window. The ratio of v divided by c produces the weight w for this stage. Next the complex conjugate 84 of w is multiplied 86 by $eps_{i+1}$ to produce the signal z. z is subtracted 88 from $d_{i-1}$ to create the output signal, $eps_i$. The first stage of the FIG. 2 filter outputs a copy of z as the overall output of the complete Wiener filter.

Further aspects of the Ricks-Goldstein adaptive filter are described in U.S. patent application Ser. No. 09/933,004, "System and Method for Adaptive Filtering," published as US 2002/0152253, previously incorporated by reference in their entirety.

Application to the Despain Multistage Wiener Filter

Figure 6:
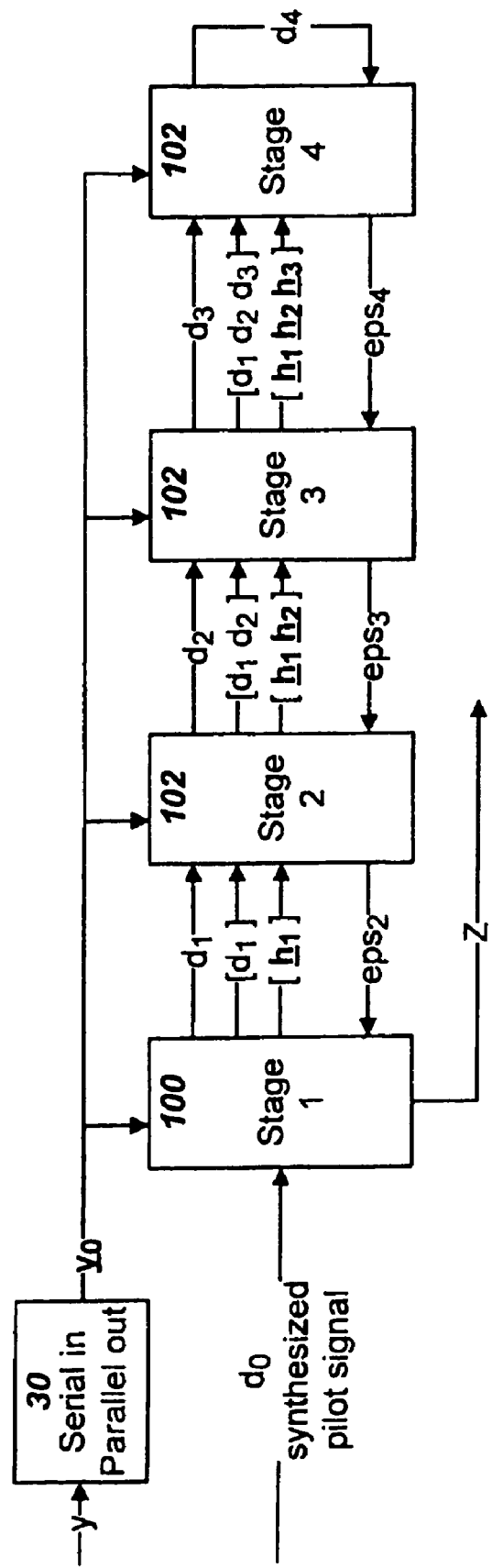
FIG. 6 illustrates the structure of an adaptive version of the Despain multistage Wiener filter according to preferred aspects of the present invention. The FIG. 6 Despain adaptive filter has an initial stage as illustrated in FIG. 7 and three stages as illustrated in FIG. 8.

FIG. 6 illustrates an adaptive Despain multistage Wiener filter that can be used as the filter 18 in the FIG. 1 downlink. Four stages are illustrated for the FIG. 6 Despain adaptive filter. As with the Ricks-Goldstein adaptive filter, simply by either deleting or adding stages one can construct larger or smaller filters. Again there will be an optimal number of stages for a given application. A significant difference between the Despain adaptive filter and the Ricks-Goldstein adaptive filter is that the vector y0 preferably is sent in parallel to all stages, rather than only to the first stage. This speeds the calculation and is possible due to the substantial differences between the architecture of the FIG. 2 and FIG. 6 filters.

Figure 7:
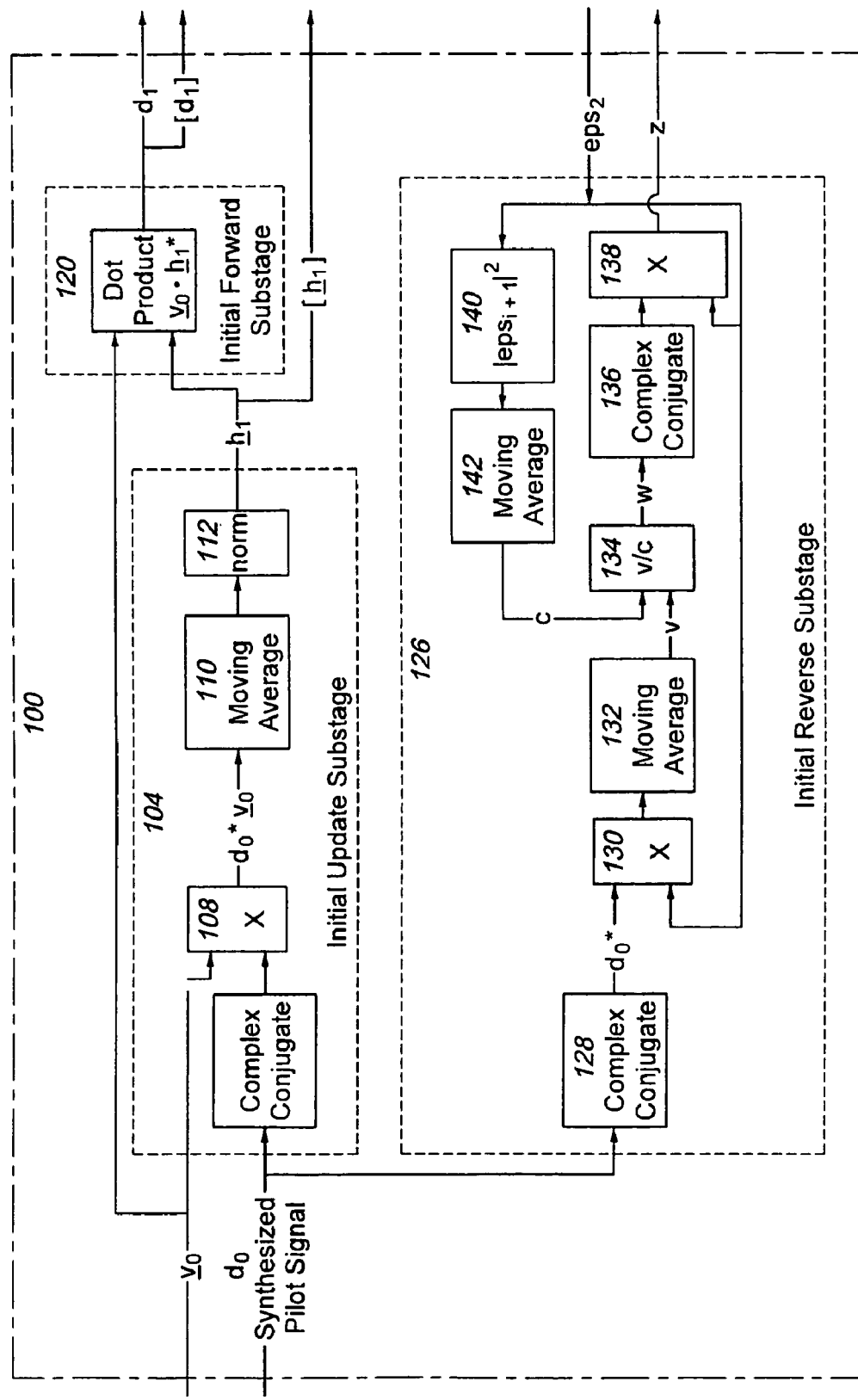
FIG. 7 illustrates the structure of the initial stage of the Despain adaptive filter of FIG. 6. The FIG. 7 stage is similar to the other stages of the FIG. 6 filter, which are shown in FIG. 8.
Figure 8:
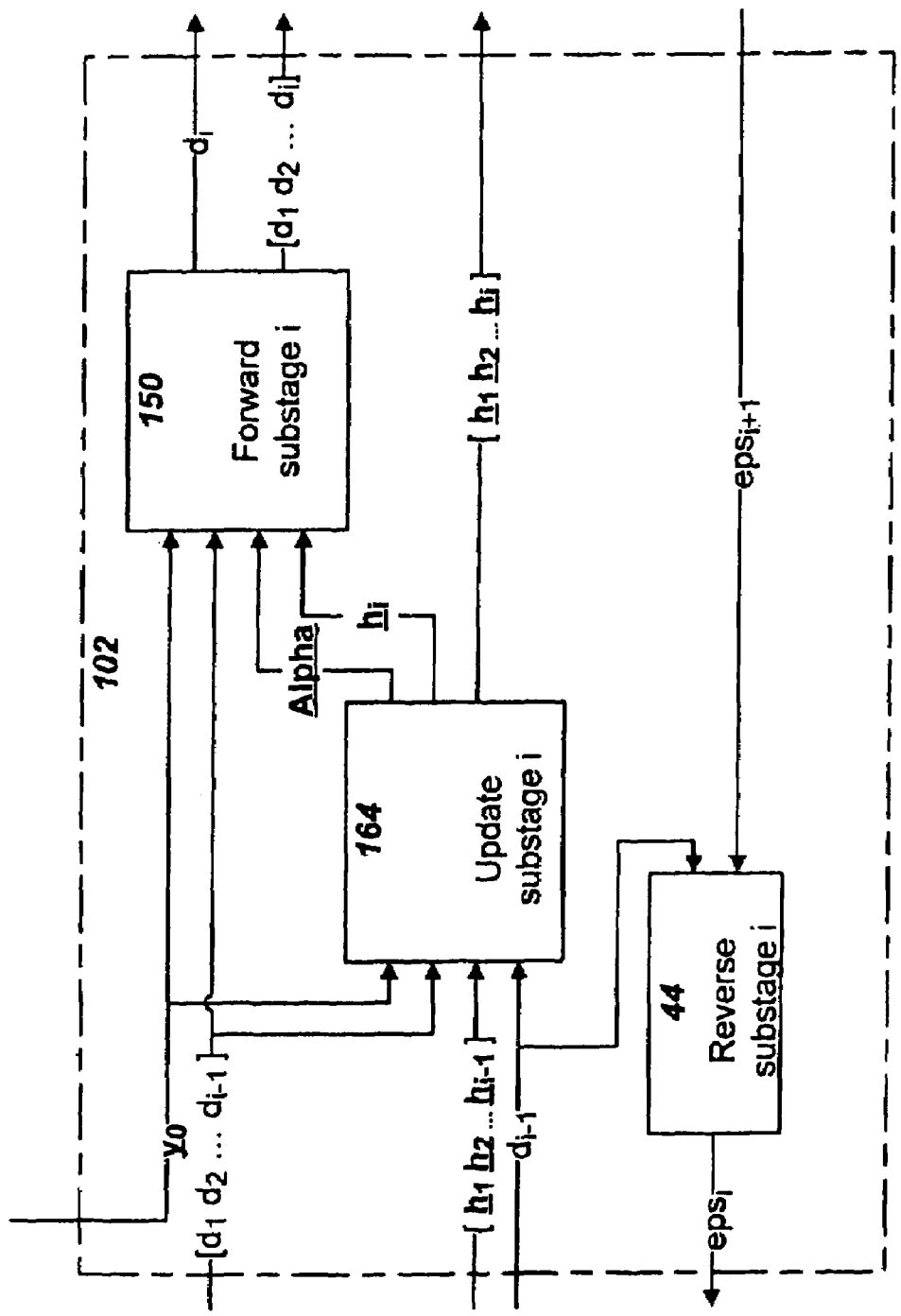
FIG. 8 illustrates the structure of the other stages of the Despain adaptive filter of FIG. 6. The reverse sub-stage of the FIG. 8 stage is the same as that shown in FIG. 5 for the Ricks-Goldstein filter.

In the Despain adaptive filter, the first stage 100 is different from the subsequent stages 102, in contrast to the Ricks-Goldstein adaptive filter, in which all stages are the same. The structure of the initial stage 100 is shown in FIG. 7. The initial stage 100 is a simplification of the circuit employed for the other stages. The structure of the other stages 102 is shown in FIG. 8. There are three parts to the initial stage 100, a forward substage 120, an update substage 104 and a reverse substage 126.

The forward substage 120 forms the dot product of the input signal vector $y_0$ and the filter coefficients $h_1$. The result generated is the intermediate signal $d_1$. This signal is sent on to the next stage of the filter as a scalar and also as a 1 element vector.

The initial update substage 104 has as inputs the vector input signal $y_0$ and the synthesized pilot signal $d_0$. $y_0$ is multiplied by the complex conjugate of the reference synthesized pilot signal $d_0$ and the result is integrated by the moving average block 110. Most preferably the integration is performed over a number of complete periods of the Walsh or orthogonal code, as appropriate to that system. As discussed above, the integration is performed over a number of code periods appropriate to limit noise while avoiding unacceptable variations in the channel characteristics. The result is a vector that is sent to a normalization block 112 that outputs the normalized filter vector $h_1$. The $h_1$ vector will have a magnitude of unity. The normalized filter vector $h_1$ is sent to the initial forward substage 120 and also to the second stage.

The initial reverse substage 126 shown in FIG. 7 can be thought of as one stage of a Wiener filter that works on the synthesized pilot signal $d_0$ and the $eps_2$ signal from the next stage. The squared magnitude 140 of $eps_2$ is calculated and is integrated in the moving average block 142 producing a result c. The $eps_2$ signal is also used to multiply 130 the complex conjugate 128 of the signal $d_0$, the result of which is also integrated in a moving average module 132 to produce the intermediate signal v. Preferably the moving average modules 132 and 142 use the same window widths as the moving average module 110. The division 134 of v by c produces w, the Wiener filter coefficient for this initial stage. Next the complex conjugate of w is taken 136 and multiplied 138 by $eps_2$ to produce the result z that is output as the overall result of the complete Wiener filter. For only this initial stage the function of the reverse substage is to adjust the amplitude of the overall filter output so as to match the amplitude of the input signal $d_0$.

The structure of the stages 102 i=2, 3, or 4, after the initial stage, is shown in FIG. 8. There are three parts to each stage 102, a forward substage 150, an update substage 164 and a reverse substage 44. The reverse substage 44 of the stage 102 is the same as that shown in FIG. 5.

Figure 9:
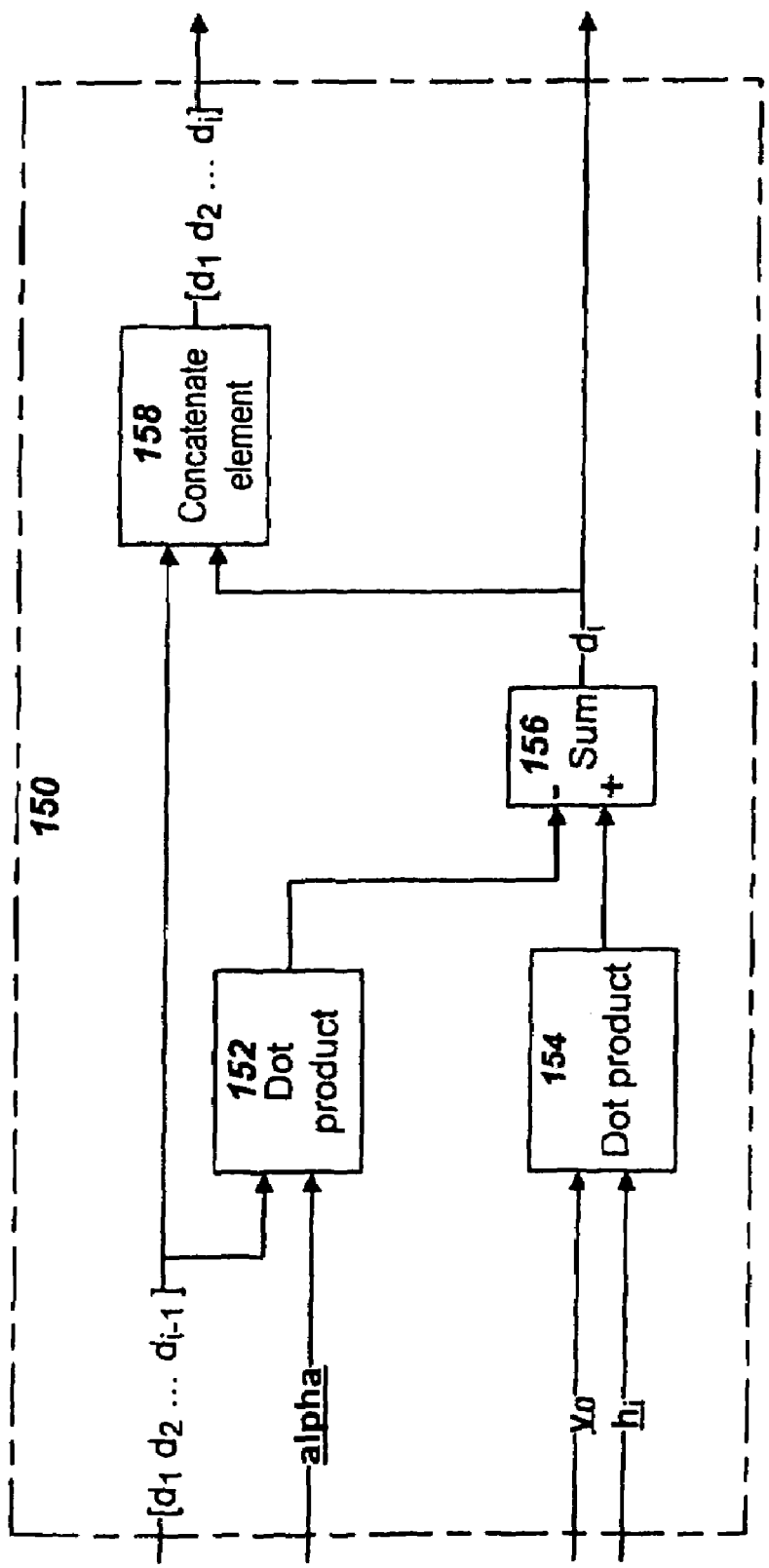
FIG. 9 illustrates the structure of a forward sub-stage of the FIG. 8 Despain adaptive filter stage.

The i-th forward substage 150 is shown in FIG. 9. The dot product 152 of the vector of signals $[d_1\ d_2\ \ldots\ d_{i-1}]$ and the coefficient vector alpha from the update substage is summed 156 with the dot product 154 of the input signal vector $y_0$ and the filter coefficients $h_i$ from the update substage to produce the output signal $d_i$. Also, the vector $[d_i\ d_2\ \ldots\ d_i]$ is formed at block 158 and sent to the next stage.

Figure 10:
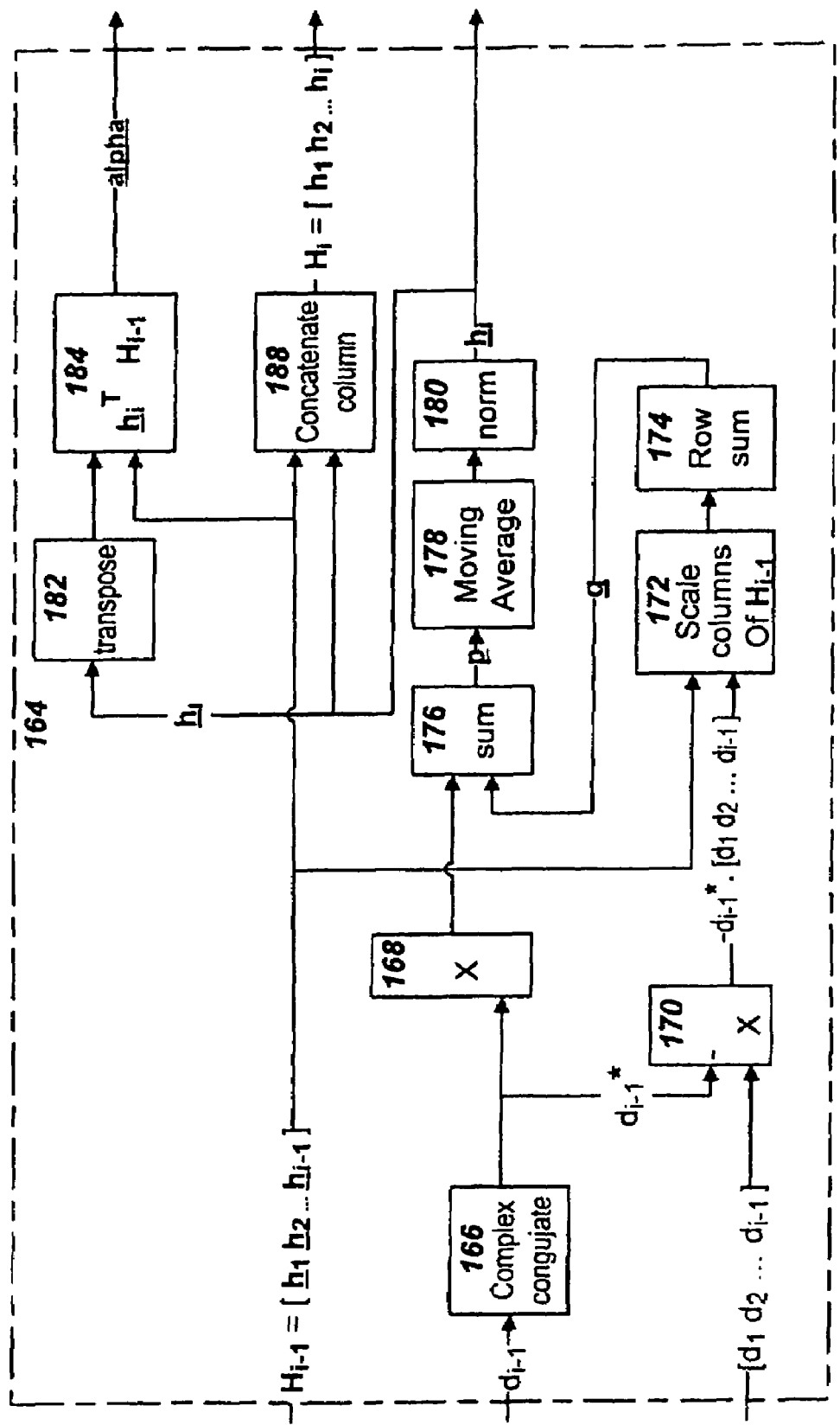
FIG. 10 illustrates the structure of an update sub-stage of the FIG. 8 Despain adaptive filter stage.

The i-th update substage 164 shown in FIG. 10 has as inputs the vector input signal $y_0$, the previous filter coefficients $H_{i-1}=[h_1\ h_2\ \ldots\ h_{i-1}]$, $d_{i-1}$ and the vector $[d_i\ d_2\ \ldots\ d_{i-1}]$. The complex conjugate 166 is taken of the $d_{i-1}$ signal from the previous stage and then multiplied 168 with the input vector signal $y_0$. Next a signal q is added 176 to this result and the intermediate result p is generated. The norm 180 of the moving average 178 of p is the result $h_i$. The signal q is generated by multiplying 170 the vector $[d_i\ d_2\ \ldots\ d_{i-1}]$ by the negative of the complex conjugate 166 $d_{i-1}^*$ of $d_{i-1}$, and using this vector to scale 172 the matrix H. The rows of the scaled matrix are summed 174 to produce the intermediate vector q. The product 184 of the transpose 182 of $h_i$ with the matrix $H_{i-1}$ generates the vector alpha, which goes to the forward substage of the current stage. The $h_i$ coefficients are concatenated 188 with the matrix $H_{i-1}$ as a new column to produce the matrix $H_i$ which is sent on to the next stage.

In each stage 102 after the initial stage 100, the integration interval of the moving average blocks 178, 74 and 78 can be set to be the same as employed for the initialization stage with good results. Under some circumstances a modified integration interval for the later stages 102 can produce improved results or reduce computational complexity. The modification can be determined either experimentally in the environment of interfering signals and noise or calculated from the known properties of the interfering signals and the noise received by the receiver. For slowly changing interfering signal and noise parameters longer integration times in the later stages 102 may be advantageous.

Also note the modified method of calculating the filter coefficients $h_1$ of the initial stage 100 so that the filter coefficients are substantially only a function of the pilot subchannel signal and the synthesized pilot signal as discussed above.

For both the Ricks-Goldstein adaptive filter and the Despain adaptive filter the vector $y_0$ is produced by sampling the down converted signal from the antenna. The rate of sampling should be at least the same as the chip rate, so that there will be at least one observation for each chip. It may be preferable to oversample. The length of the vector $y_0$ will be the number of chips comprising the delay spread times the degree of oversampling. For example, if 16 chip times covers the desired delay spread, then the length of $y_0$ for 2 times oversampling will be 32.

Application to Receivers with Multiple Antennas

Figure 11:
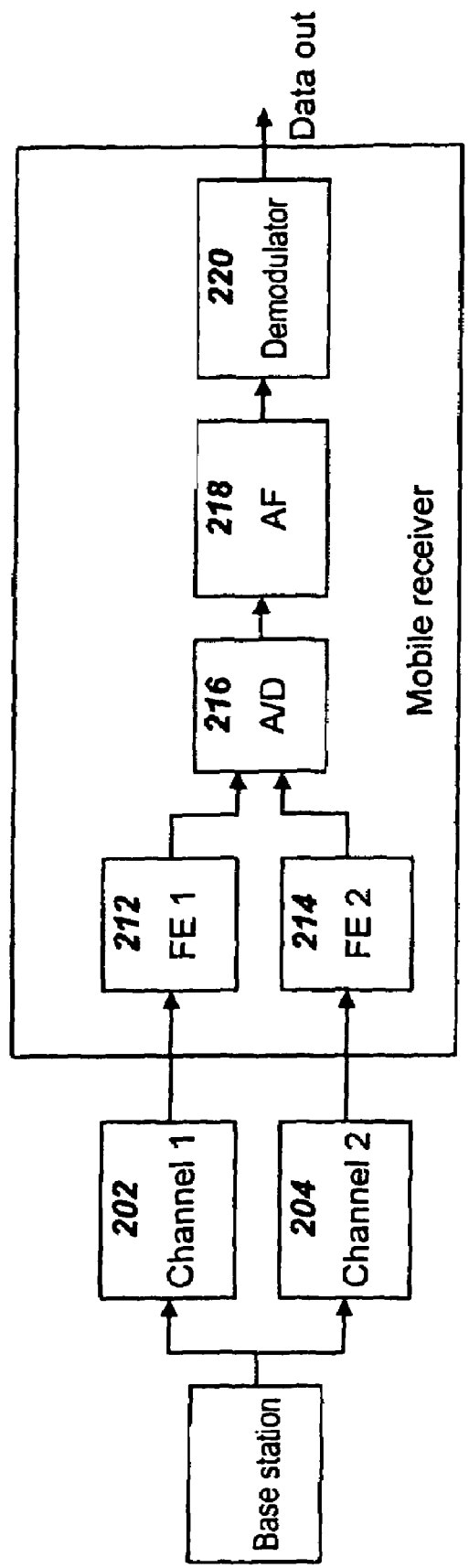
FIG. 11 illustrates a downlink for a CDMA system with two antennas in a receiver according to preferred embodiments of the invention.

A diversity of independent antennas and receiver front ends tuned to the same transmitter signal can be employed to improve the performance of a radio system if the separate signals received can be properly combined before detection. Adaptive filters according to the present invention are well suited for this task and are simply expanded to handle the increased data processing. FIG. 11 illustrates how an adaptive filter according to the invention can be employed for a two-antenna example. Expanding this example to more than two antenna systems will be apparent to those skilled in the art.

In the two antenna case, there are two slightly different channels 202 and 204 between the base station and each of the two antennas. Two front end modules 212 and 214 receive these signals and down convert them to baseband. A two-channel analog to digital converter 216 accepts the two analog inputs from the two radio front-end modules, and then produces interleaved digital representations of the input signals. This combined stream of digital sample values is then sent to an adaptive filter 218 in accordance with the invention. The output of adaptive filter 218 is, as before, sent to a demodulator 220.

The adaptive filter 218 is preferably identical to those discussed above except the processing bandwidth preferably is doubled over that of the previously discussed filters. There are many ways well known to those skilled in the art to double the processing bandwidth. As compared to the FIG. 6 filter implementation, for example, the serial-in, parallel-out shift register can be doubled in size to produce double the number of parallel outputs at the same rate as before. Then each stage of the filter can be enlarged to accept, in parallel, a vector $y_0$ of twice the previous size. The appropriate data paths through each stage are thus similarly doubled in size (the vectors $y_i$, etc., are doubled in length). The time window representing the desired delay spread preferably is adjusted so that the strong signals from the base station to both antennas are within the window. The processing otherwise remains the same.

The filtered signal result can be substantially improved by this method of diversity combining the multiple antenna signals while equalizing all the inputs for multipath propagation effects. For a two-antenna system, depending upon the particular propagation channels and the relative physical separation and orientation of the two antennas, simulation results indicate effective SNR (signal-to-noise) ratio improvements of between about 2 dB to 10 dB by using two antennas. Employing even more independent antennas is expected to offer even more improvement at the cost of providing the receiver front-end processing and increasing the $y_0$ vector data path correspondingly in the adaptive filter.

The Performance of the Adaptive Filter Compared to a Rake Receiver

Figure 12:
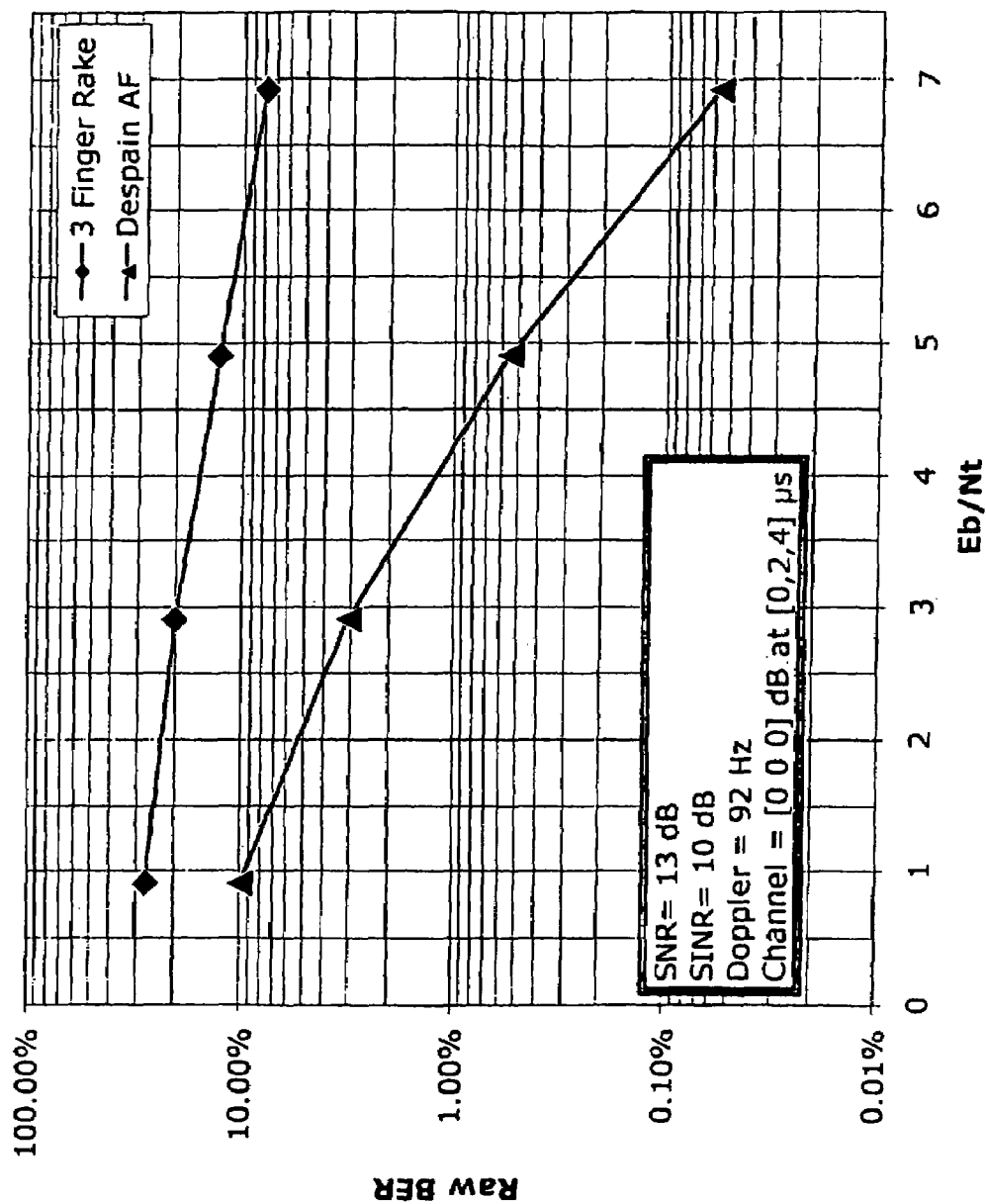
FIG. 12 illustrates the general performance of a receiver using the Despain adaptive filter of FIG. 6 relative to a rake receiver having three rake fingers.

The performance (as determined by simulation) of a receiver employing a Despain multistage adaptive filter according to the present invention is compared to the performance of a three-finger rake receiver in FIG. 12. Three equal power paths, two µsec apart, are present in the simulation. The three paths represent all of the energy of the signal. The Doppler contribution is set to 92 Hz. The bit error rate is calculated using a slicer at the output of the rake fingers, rather than a Viterbi decoder. The Viterbi decoder would improve the performance of both the rake receiver and the Despain adaptive filter. Note the significant improvement in performance when the Despain multistage adaptive Wiener filter implementation is employed.

There are a number of other orthogonal codes that are well known to those skilled in the art that could be employed in place of the Walsh codes of CDMA 2000 and WCDMA to separately encode each subchannel. For simplicity the above discussion referenced all orthogonal codes as "Walsh codes."

Future modifications and improvements on these CDMA networks are expected and aspects of the present invention are expected to find application in such future networks to the extent the future networks use a pilot or like channel. It should be noted that the conclusions drawn here apply to the WCDMA system in the manner discussed as well as other direct sequence spread spectrum (DSSS) CDMA based communication systems.

Particularly preferred embodiments of this invention provide a CDMA receiver solution providing equalization and interference rejection, at a modest computational expense, without knowledge of any underlying user/network modulated information, while providing a solution that improves intercell interference and tracking/mitigating of multipath profiles known to occur in cellular networks. In many instances, the coding and spreading gains provided in CDMA 2000-1x as implemented according to the above discussion are sufficient for reliable communication at desired bit rates with gains in multipath reception and interference rejection.

The present invention has been described in terms of certain preferred embodiments. Those of ordinary skill in the art will appreciate that various modifications might be made to the embodiments described here without varying from the basic teachings of the present invention. Consequently the present invention is not to be limited to the particularly described embodiments but instead is to be construed according to the claims, which follow.

What is claimed is:

1. A CDMA wireless communication system, comprising:
a receiver having an adaptive filter coupled to receive an input signal comprising a plurality of user signals and a pilot signal, the input signal characterized by a symbol period defined by a CDMA transmitter,
wherein the adaptive filter comprises:
a multiplier coupled to receive the input signal and to receive a synthesized pilot signal, the multiplier providing a multiplier output; and
an integrator coupled to receive the multiplier output and to generate at least one filter coefficient determined from the input signal multiplied by a synthesized pilot signal with a result integrated over an integer number of symbol periods.

2. The system of claim 1, wherein the adaptive filter is a Wiener filter.

3. The system of claim 1, wherein the adaptive filter is a multistage Wiener filter.

4. The system of claim 1, wherein the adaptive filter further comprises the multiplier receives the input signal and the synthesized pilot signal and outputs a multiplication result which is then integrated over the integer number of symbol periods to produce an integrated result that is then used to determine a set of filter coefficients that are then used to filter the input signal.

5. The system of claim 4, wherein the integrated result is obtained by summing.

6. The system of claim 4, wherein the integrated result is obtained by averaging.

7. The system of claim 4, wherein the integrated result is obtained in an initial stage of a multistage Wiener filter.

8. The system of claim 7, wherein stages of the multistage Wiener filter other than the initial stage use integration intervals different than the initial stage.

9. The system of claim 7, wherein the initial stage of the multistage Wiener filter compensates for physical delay and other stages of the multistage Wiener filter compensate for interference to a greater extent than the initial stage.

10. A CDMA wireless communication system, comprising:
a receiver having an adaptive matched filter coupled to receive an input signal comprising a plurality of user signals and a generated pilot signal, the input signal characterized by a symbol period defined by a CDMA transmitter,
the adaptive matched filter comprising cross correlation circuitry coupled to receive the input signal and the generated pilot signal,
wherein the adaptive matched filter has at least one filter coefficient determined in the cross correlation circuitry by cross correlation of the input signal with the generated pilot signal where the cross correlation is performed over an integer number of symbol periods.

11. The system of claim 10, wherein the cross correlation includes integration over the integer number of symbol periods.

12. The system of claim 11, wherein the symbol periods are Walsh code periods defined by a CDMA transmitter.

13. The system of claim 11, wherein the cross correlation is followed by normalization of the cross correlation result and the cross correlation result is further processed to generate a set of filter coefficients that are then used to filter the input signal.

14. The system of claim 13, wherein the set of filter coefficients determines the characteristics of the adaptive matched filter and wherein the cross correlation includes integration over the integer number of symbol periods.

15. The system of claim 14, wherein the symbol period is a Walsh code period.

16. The system of claim 10, wherein the adaptive matched filter is one stage of a multistage Wiener filter.

17. The system of claim 16, wherein the cross correlation includes integration over an integer number of Walsh symbol periods.

18. The system of claim 17, wherein stages of the multistage Wiener filter other than the adaptive matched filter compensate both signal interference and multipath.

19. A CDMA wireless communication system, comprising:
a receiver comprising an adaptive matched filter coupled to receive an input signal comprising a plurality of user signals and a pilot signal, the input signal characterized by a symbol period defined by a CDMA transmitter, the receiver further comprising reference signal generation circuitry for generating a reference signal, the adaptive matched filter comprising multiplication circuitry and averaging circuitry, the multiplication circuitry receiving the input signal and the reference signal and providing a multiplication output, the averaging circuitry coupled to receive the multiplication output and performing an averaging over an integer number of symbol periods to provide an averaged output, wherein the adaptive matched filter determines a set of filter coefficients from the averaged output, the adaptive matched filter filtering at least one of the user signals using the set of filter coefficients.

20. A CDMA wireless communication system, comprising:

a receiver having an adaptive Wiener filter coupled to receive an input signal comprising a plurality of user signals and a pilot signal, the plurality of user signals characterized by an orthogonal code modulation, the receiver generating a reference signal, the adaptive Wiener filter comprising a correlator coupled to receive the input signal and the reference signal, the correlator performing a correlation process with the input signal and the reference signal with the correlation process comprising averaging for an integer number of orthogonal code periods, wherein the Wiener filter has at least one filter coefficient determined by the correlation process between the input signal and the reference signal generated by the receiver.

21. The CDMA system of claim 20, wherein the orthogonal code is a Walsh code.

22. A CDMA wireless communication system, comprising:

a receiver having an adaptive multistage Wiener filter coupled to receive an input signal comprising a plurality of user signals and a pilot signal, the plurality of user signals characterized by an orthogonal code modulation, the adaptive multistage Wiener filter comprising a cross correlator coupled to receive the input signal and the pilot signal, the cross corretator performing a cross correlation with the input signal and the pilot signal including an integration over of an integer number of orthogonal code periods, wherein the adaptive multistage Wiener filter has at least one set of filter coefficients determined from the cross correlation between the pilot signal and the input signal in one processing stage so that the cross correlation characterizes a channel between the receiver and a CDMA transmitter, the adaptive multistage Wiener filter filtering the input signal in the one processing stage and in other processing stages.

23. A CDMA wireless communication system, comprising:

a receiver having an adaptive filter coupled to receive an input signal comprising a plurality of user signals and at least one pilot signal, with the plurality of user signals each modulated by a Walsh code, and with the plurality of Walsh code modulated signals and the pilot signal further modulated by at least one of a set of pseudo random codes, wherein the adaptive filter comprises a matched filter, the matched filter comprising a correlator receiving the input signal and the pilot signal, the matched filter having at least one matched filter coefficient determined by the correlator correlating the input signal and the pilot signal in time segments, magnitudes of correlations of the user signals averaging substantially to zero over the time segments so that the matched filter coefficients are obtained substantially from correlations of the pilot signal so that the correlating process characterizes a signal channel between the receiver and a CDMA transmitter, the matched filter filtering the input signal.

24. The system of claim 23, wherein the adaptive filter is a multistage Wiener filter.

25. The CDMA system of claim 24, wherein the one pseudo random code identifies the CDMA transmitter and the Walsh codes identify users within a cell.

26. A CDMA wireless communication system, comprising:

a receiver having an adaptive filter coupled to receive an input signal comprising a plurality of user signals and at least one pilot signal, with the plurality of user signals modulated by Walsh codes, the modulated user signals and the pilot signal further modulated by at least one of a set of pseudo random codes, wherein the adaptive filter comprises at least a matched filter, the matched filter comprising a correlator receiving the input signal and the pilot signal, the matched filter having matched filter coefficients determined by the correlator averaging correlations of the input signal and the pilot signal over one or more Walsh code periods, magnitudes of correlations from user signal components of the input signal averaging substantially to zero over the one or more Walsh code periods so that the at least one adaptive filter coefficient is obtained from at least the pilot signal so that correlations characterize a signal channel between the receiver and a CDMA base station, the matched filter filtering the plurality of user signals.

27. The system of claim 26, wherein the adaptive filter is a multistage Wiener filter.

28. The system of claim 26, wherein the pilot signal is modulated by one of the periodic Walsh codes.

29. The system of claim 26, wherein the one pseudo random code identifies the CDMA base station and the Walsh codes identify users within a cell.

30. A CDMA wireless communication system, comprising:

a receiver having an adaptive filter coupled to receive an input signal comprising a plurality of user signals and at least one pilot signal, with at least the plurality of user channels signals modulated by Walsh codes, the plurality of user signals and the pilot signal modulated by at least one of a set of pseudo random codes, wherein the adaptive filter comprises at least a matched filter comprising an integrator, the matched filter having matched filter coefficients determined by the integrator integrating a correlation signal generated from the input signal over one or more Walsh code periods, magnitudes of user signals integrating substantially to zero over the one or more Walsh code periods so that the matched filter coefficients are obtained from at least the pilot signal in the matched filter that characterizes a signal channel between the receiver and a CDMA base station, and wherein the matched filter filters the plurality of user signals.

31. The system of claim 30, wherein the adaptive filter is a multistage Wiener filter.

32. The system of claim 31, wherein the multistage Wiener filter is positioned within the receiver between an analog to digital conversion circuit and a CDMA demodulator.

33. A CDMA wireless communication system, comprising:
- a receiver having an adaptive filter coupled to receive an input signal comprising a plurality of user signals and a known signal, the known signal comprising a known version of a sync signal, the input signal characterized by a symbol period defined by a CDMA transmitter,
- the adaptive filter comprising multiplication and integration circuitry, the multiplication and integration circuitry coupled to receive the input signal and the known signal and adapted to output at least one filter coefficient,
- wherein the at least one filter coefficient is determined from the input signal multiplied by the known signal with a result integrated over one or more complete symbol periods.

34. The system of claim 33, wherein the adaptive filter multiplies the input signal with the known signal to produce a result that is integrated over more than one symbol period to produce an integrated result that is then used to determine a set of filter coefficients, the set of filter coefficients used to filter the input signal.

35. The system of claim 33, wherein the adaptive filter is a Wiener filter.

36. The system of claim 33, wherein the adaptive filter is a multistage Wiener filter.

37. The system of claim 33, wherein the sync signal is used with a pilot signal to determine all filter coefficients of a matched filter portion of the adaptive filter.

38. A CDMA wireless communication system, comprising:
- a receiver having an adaptive filter coupled to receive an input signal comprising a plurality of user signals and known signals, the known signals comprising a pilot signal and a sync signal, the input signal characterized by a symbol period defined by a CDMA transmitter,
- the adaptive filter comprising multiplication and integration circuitry, the multiplication and integration circuitry coupled to receive the input signal and at least a portion of the known signals and adapted to output at least one filter coefficient,
- wherein the adaptive filter has at least one filter coefficient determined by the multiplication and integration circuitry by multiplying the input signal by a locally generated reference signal which is a composite of signals corresponding to the one or more of the known signals to generate a multiplication result with the multiplication result integrated over one or more complete symbol periods.

39. The system of claim 38, wherein the adaptive filter multiplies the input signal with the locally generated reference signal to produce a result that is integrated over more than one symbol periods to produce an integrated result that is then used to determine a set of filter coefficients, the set of filter coefficients used to filter the input signal.

40. The system of claim 39, wherein the adaptive filter is a Wiener filter.

41. The system of claim 39, wherein the adaptive filter is a multistage Wiener filter.

42. The system of claim 41, wherein the sync signal is used with a pilot signal to determine all filter coefficients of a matched filter portion of the adaptive filter.

43. A multiple access wireless communication system, comprising:
- a receiver having an adaptive filter coupled to receive an input signal comprising one or more user signals, the input signal characterized by an encoding identifying a base station that transmitted the input signal, the receiver generating a reference signal,
- the adaptive filter comprising correlation circuitry, the correlation circuitry coupled to receive the input signal and the reference signal and adapted to output at least one filter coefficient,
- wherein the correlation circuitry determines from the input signal at least one filter coefficient prior to the adaptive filter decoding the input signal, the correlation circuitry identifying a component of the input signal that is predictable only over a portion of a time interval, the correlation circuitry providing an output signal, the adaptive filter determining at least one filter coefficient from an average of two or more values respectively determined from two or more successive occurrences of the component of the input signal.

44. The system of claim 43, wherein the adaptive filter is a Wiener filter.

45. The system of claim 43, wherein the adaptive filter is a multistage Wiener filter.

46. The system of claim 43, wherein the component of the input signal is a sync signal.

47. The system of claim 46, wherein the sync signal is used to determine all coefficients of a matched filter portion of the adaptive filter.

48. The system of claim 46, wherein the sync signal is used with a pilot signal to determine all filter coefficients of a matched filter portion of the adaptive filter.

49. The system of claim 43, wherein the adaptive filter determines a set of matched filter coefficients of a matched filter from the component of the input signal and the receiver filters the input signal at least in part using the matched filter.

50. The system of claim 49, wherein the adaptive filter is a multistage Wiener filter.

51. The system of claim 43, wherein the receiver generates a reference signal synchronized with the input signal and the adaptive filter performs a correlation between the input signal and the reference signal to remove unpredictable portions and to isolate predictable portions of the input signal, the adaptive filter using the correlation to determine coefficients of a matched filter and using the matched filter to at least in part filter the input signal.

52. The system of claim 51, wherein the adaptive filter is a multistage Wiener filter.

53. The system of claim 43, wherein the component of the input signal that is predictable only over a portion of the time interval is used with a pilot signal to determine all filter coefficients of a matched filter portion of the adaptive filter.

54. A receiver for a multiple access wireless communication system, the receiver comprising:
- an adaptive filter coupled to receive an input signal comprising one or more user signals, the input signal characterized by an encoding identifying a base station that transmitted the input signal; and
- a reference signal generator that generates a local reference signal synchronized with the input signal,
- the adaptive filter comprising correlation circuitry, the correlation circuitry coupled to receive the input signal and the local reference signal, the correlation circuitry performing correlations over time intervals,
- wherein the correlation circuitry performs correlations between the input signal and the local reference signal to remove unpredictable portions and to isolate predictable portions of the input signal, the adaptive filter using the correlation to determine coefficients of a matched filter prior to decoding the input signal and using the matched filter to at least in part filter the input signal, wherein the adaptive filter determines coefficients of the matched filter from an average of two or more of the correlations using successive portions of the input signal.

55. The system of claim 54, wherein the adaptive filter is a Wiener filter.

56. The system of claim 54, wherein the adaptive filter is a multistage Wiener filter.

57. The system of claim 54, wherein the input signal is further characterized by an organization into successive time intervals of a predetermined length and the adaptive filter performs the correlations on portions of the input signal each spanning one of the time intervals.

58. The system of claim 54, wherein the adaptive filter determines the coefficients of the adaptive filter from a component of the input signal that is predictable only over a portion of a time interval.

59. The system of claim 58, wherein the adaptive filter is a Wiener filter.

60. The system of claim 58, wherein the adaptive filter is a multistage Wiener filter.

61. The system of claim 54, wherein the input signal is further characterized by an organization into successive time intervals of a predetermined length, the adaptive filter performs the correlations on portions of the input signal each spanning one of the time intervals and the predictable portions of the input signal are predictable only over a portion of the time intervals.

62. The system of claim 61, wherein the adaptive filter is a Wiener filter.

63. The system of claim 61, wherein the adaptive filter is a multistage Wiener filter.

64. The system of claim 61, wherein the predictable portions of the input signal are part of a sync signal.

65. The system of claim 61, wherein the predictable portions of the input signal are a sync signal and a pilot signal.

66. The system of claim 64, wherein the predictable portions include a pilot signal and another signal that is predictable only over a portion of a time interval.

67. The system of claim 66, wherein the adaptive filter is a Wiener filter.

68. The system of claim 66, wherein the adaptive filter is a multistage Wiener filter.

* * * * *